United States Patent Office 3,796,738
Patented Mar. 12, 1974

3,796,738
RARE EARTH FLUOROALIPHATIC SULFONATES
Karl F. Thom, St. Paul, Minn., assignor to Minnesota Mining and Manufacturing Company, St. Paul, Minn.
No Drawing. Original application Oct. 30, 1969, Ser. No. 872,726, now Patent No. 3,615,169. Divided and this application Jan. 25, 1971, Ser. No. 109,579
Int. Cl. C07f 5/00
U.S. Cl. 260—429 R    2 Claims

ABSTRACT OF THE DISCLOSURE

A method is disclosed for the preparation of anhydrous fluorides of high purity substantially free from oxyfluorides of trivalent metals of Group IIIb of the periodic system particularly of scandium, yttrium and the lanthanide rare earth metals by pyrolysis of fluoroaliphatic-sulfonates of these metals. A process for producing the latter salts which are isolated as complexes with water or organic molecules is also disclosed. These salts have unusual solubility properties.

---

This is a division of application Ser. No. 872,726 filed Oct. 30, 1969, now U.S. Pat. 3,615,169.

This invention relates to a method for forming fluorides of metals of Group IIIb of the periodic system in the di or trivalent condition and particularly to a pyrolytic process for pyrolytically decomposing metalic tris(fluoroaliphatic-sulfonates) to give metalic fluorides together with gaseous by-products which are swept away in an inert gas such as $N_2$, Ar or the like. This invention is also concerned with production of fluoroaliphatic-sulfonate salts and complexes thereof with water and/or organic hetero-atom oxide ligands.

Four commercial processes have been disclosed and are described by J. H. Moriarty, Jr., J. of Metals, vol. 68, November 1968, pages 41–45. These processes react the desired oxide with HF or ammonium fluoride, or react the chloride with HF followed by dehydration of the hydrate of the fluoride.

Moriarty points out that the rare earth fluorides obtained cannot be dehydrated satisfactorily on an industrial scale. This conclusion is substantiated by Wendlandt and Love, in Science 129, 342 (1959), in thermal gravimetric analysis studies of rare earth compounds. In this latter case there is a continual decrease in weight rather than a break in the decomposition curve corresponding to the loss of a definite number of moles of water. The formation of an oxyfluoride is observed between 600°–690° C. The process does not result in a pure fluoride even at temperatures of 900° C. Hence no previous process permits the formation of anhydrous fluoride. The presence of water in all previous instances fosters the formation of oxyfluorides which contaminate the rare earth fluoride.

In the present specification and claims the term "rare-earth" includes the lanthanide rare-earths, yttrium and scandium. The preparation of pure rare earth fluorides is important because they are used in electronic applications, as catalysts, and as starting material for the preparation of rare earth metals. The use of lanthanum fluoride in infra-red optics is described in U.S. Pat. 3,437,724. During metal preparation from the trifluoride, any oxyfluoride which remains dispersed throughout the metal as a nonmetallic inclusion makes fabrication of the metal extremely difficult.

It is an object of this invention to produce fluorides of Group IIIb trivalent metals in particular of scandium, yttrium and the lanthanides. A further object is to produce such fluorides in essentially pure trifluoride form substantially free from oxyfluorides or hydrolysis products. Another object of the invention is to provide novel fluoroaliphatic sulfonate salts of IIIb metals. Other objects will become apparent hereinafter.

It has been found that the thermal decomposition of rare earth metal salts of fluoroaliphatic sulfonic acids, such as perfluoroalkane, perfluorocycloalkane and substantially fluorinated alkane and cycloalkane sulfonic acids, provides pure rare earth metal fluorides. Hetero atoms of O or N may occur in these sulfonic acids.

The salts of the rare earth metals are prepared by reacting the rare earth oxides which may be present only in the ore or as a crude concentrate with the required fluoroaliphatic sulfonic acids (described, for example, in U.S. 2,732,398). The salts are obtained as nonahydrates or complexes with organic hetero-atom oxide ligands of different structures. The complex salts are thermally decomposed between about 500° and 1000° C. in an inert (argon or nitrogen) or reducing (hydrogen) atmosphere. The complexes with organic ligands appear to decompose at somewhat lower temperatures.

In addition it is found that the decomposition of fluoroaliphatic sulfonic acids results in degradation with loss of the sulfonic group and formation of the corresponding fluoroalkanoic acid fluoride:

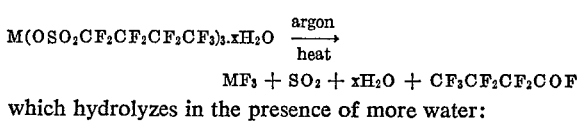

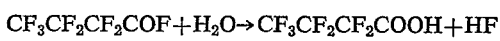

which hydrolyzes in the presence of more water:

$$CF_3CF_2CF_2COF + H_2O \rightarrow CF_3CF_2CF_2COOH + HF$$

The procedure of the invention yields a pure rare earth fluoride by the following illustrative reaction in which M is a metal of the group of scandium, yttrium and the lanthanides.

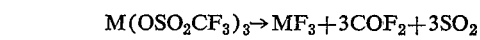

The reaction is often effected using the hydrated salt which seems not to interfere with forming an anhydrous metallic fluoride. The liberated water appears to be carried away in outgases before there is any reaction with the metallic fluoride.

The hydrated rare earth metal perfluoroalkane sulfonate salts are soluble in acetonitrile, water and certain oxygenated organic solvents such as tetrahydrofuran, methanol, ethanol, isopropanol, acetone, methylethylketone and ethylacetate. The outstanding solubility of the hydrated rare earth trifluoromethane sulfonates makes them valuable homogeneous catalysts and may aid in separation problems. They form nonahydrates and lose water under various methods of drying. Thus the neodymium tris-perfluoromethane sulfonate nonahydrate yields the octahydrate when dried over concentrated sulfuric acid and is further altered to a di- or trihydrate by drying under vacuum.

The hydrated salts are readily crystallized from solution and are then obtained in a very pure form. The hydrated salts in alcoholic solution react with liquids such as four moles of hexamethyltriamine phosphine oxide, e.g.,

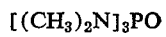

or five moles of N-methyl morpholine oxide to give precipitates of complexes which are significantly soluble in such halogenated solvents as chloroform. The rare earth perfluoroalkane sulfonate salts containing water or organic liquids are remarkable in their decomposition to give fluorides by breakdown of fluoroaliphatic sulfonic acids.

The crystal structures of the nonahydrated salts obtained from the reaction of neodymium oxide ($Nd_2O_3$) and yttrium oxide ($Y_2O_3$) with trifluoromethane sulfonic acid ($CF_3SO_3H$) were determined by X-ray diffraction. The compounds crystallize with nine moles of water in the hexagonal system. The chemical similarity of the rare earth elements assures that all the tris salts of trifluoromethane sulfonic acid should have similar structures.

The fluoroaliphatic sulfonic acids which are used include straight chain and branched 1° and 2° perfluoroalkane, cycloalkane sulfonic acids and also similar acids containing hydrogen atoms not on the carbon atom adjacent to the sulfonic group. Many such acids are available from the literature including those in which hetero atoms, e.g., oxygen and nitrogen, are included in the chains. Such hetero atoms generally exert very little influence on the reactions of the acids.

Thermal decomposition of these hydrated salts or those complexed with oxygen containing organic ligands yields pure rare earth fluorides. The purity of these salts is established by analysis of the original rare earth perfluoroalkane sulfonate and by following the weight loss of these salts. The product is also corroborated by X-ray analysis. The by-product gases, $COF_2$ and $SO_2$, are detected by infrared analyses. Flurodies prepared from organo-complexed salts may show slight discoloration which is believed to be due to traces of impurities carried by the ligands.

The Group IIIb metals employed as their fluoroaliphatic or perfluoroalkane sulfonates have atomic numbers from 21 through 71.

For comparison the rare earth metal fluorosulfonates and trifluoroacetates are prepared by reaction of the same oxide with fluorosulfonic and trifluoroacetic acids respectively. The lanthanum and neodymium fluorosulfonates, $La(SO_3F)_3$ and $Nd(SO_3F)_3$, are insoluble in organic solvents and sparingly soluble in water. Pyrolysis of these salts in argon does not yield the fluoride, but instead gives oxysulfates ($La_2O_2SO_4$ and $Nd_2O_2SO_4$). The salts of trifluoroacetic acid are soluble in organic solvents and water, but during pyrolysis extensive foaming ($CO_2$ liberation) is encountered. The resulting product is gray to black in color and probably contains some oxide or carbon or a carbon compound.

The perfluoroalkane sulfonates employed in this invention are formed by reacting the oxide with fluoroaliphatic sulfonic acid according to the reaction.

VI) $M_2O_3 + 6HOSO_2R_f \rightarrow 2M(OSO_2R_f)_3 + 3H_2O$ here $R_f$ may be straight chain or branched and is a fluoroaliphatic radical of 1 to 18 carbon atoms which may contain catenary ether oxygen or tertiary amine nitrogen atoms. A preferred salt is $M(OSO_2CF_3)_3$.

EXAMPLE 1

Neodymium oxide ($Nd_2O_3$ available from Molybdenum Corporation of America; 99.9% pure) 10.0 gm. (29.7 mM.) is treated with 25 ml. $H_2O$ in a Petri dish. Freshly distilled trifluoromethane sulfonic acid ($CF_3SO_3H$-anhydrous) (27.0 gm.–180 mM.) is added dropwise to the stirred slurry and the oxide dissolves completely with evolution of heat. Additional water may be added if desired to moderate the exothermic reaction. The solution is heated gently on a hot plate to evaporate water and the pink salt crystallizes. The resulting salt weighs 53.9 gm. which indicates a slight excess of water over the formula $Nd(OSO_2CF_3)_3 \cdot 9H_2O$. The salt is dried in an oven at 130° C. for 48 hours. The resulting product contains 4.78% $H_2O$ (4.82%–4.73% by Karl Fisher Titration). This corresponds to $Nd(OSO_2CF_3)_3 \cdot 1.65H_2O$.

A portion of this salt (0.9541 gm.) is heated to 800° C. in an alumina boat in a rapid stream of argon. The decomposition continues over a 4 hour period. The weight loss is 67.68%. For the reaction:

$$Nd(OSO_2CF_3)_3 \cdot 1.65H_2O \rightarrow NdF_3$$

the theoretical loss is 67.70%. X-ray analysis shows that the residual product is pure $NdF_3$.

Other preparations (Examples 2–7) are carried out in the same manner as Example 1 using 10.0 gm. of trivalent rare earth oxide in each case and decomposing at 800° C. in argon atmosphere. The data obtained are tabulated below. Similar results are obtained using other inert gases, e.g., $N_2$. Example 8 is carried out similarly using an atmosphere of hydrogen at 1000° C. The product is $EuF_2$.

| Example | Salt | Color | Percent $H_2O$ after drying | Pyrolysis weight loss for $MF_3$, percent | | X-ray |
|---|---|---|---|---|---|---|
| | | | | Found | Calc. | |
| 2 | $La(OSO_2CF_3)_3 \cdot XH_2O$ | White | 6.40 | 69.04 | 68.71 | $LaF_3$ |
| 3 | $Pr(OSO_2CF_3)_3 \cdot XH_2O$ | Green | 6.13 | 69.12 | 68.93 | $PrF_3$ |
| 4 | $Sm(OSO_2CF_3)_3 \cdot XH_2O$ | White | 5.36 | 66.9 | 67.16 | $SmF_3$ |
| 5 | $Gd(OSO_2SF_3)_3 \cdot XH_2O$ | do | 6.31 | 68.4 | 66.8 | $GdF_3$ |
| 6 | $Y(OSO_2CF_3)_3 \cdot XH_2O$ | do | 10.77 | 77.3 | 75.7 | $YF_3$ |
| 7 | $Eu(OSO_2CF_3)_3 \cdot XH_2O$ | do | 9.00 | 70.1 | 68.3 | $EuF_3$ |
| 8 | $Eu(OSO_2CF_3)_3 \cdot XH_2O$ | do | 9.00 | 72.7 | 71.1 | $EuF_2$ |

EXAMPLE 9

A series of complexes of Group 3 fluoroaliphatic sulfonates are prepared by dissolving the appropriate partially hydrated fluoroaliphatic sulfonate in absolute ethanol and adding a solution of seven moles of the ligand in absolute ethanol. The complexes precipitate from absolute ethanol and are collected, washed with absolute ethanol and dry ether and dried over $P_2O_5$ in a dessicator.

The ligands considered representative of hetero atom oxide ligands are:

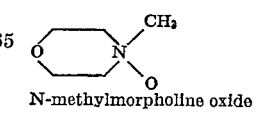  [(CH_3)_2N]_3PO

N-methylmorpholine oxide     hexamethylphosphoramide

These are represented in formulae by abbreviations $\overline{NMMO}$ and $\overline{HMPA}$ respectively. The compositions, colors, decomposition points and analyses for C, H and O are tabulated below. Each decomposes to the pure fluoride. Naturally pyrolysis is more rapid at higher temperatures.

$L_n M(OSO_2CF_3)_3$

| Compound | Color | M.P.[1] (°C.) | Calculated | | | Found | | |
|---|---|---|---|---|---|---|---|---|
| | | | C | H | N | C | H | N |
| (HMPA)₄La(OSO₂CF₃)₃ | White | 310 | 24.9 | 5.5 | 12.9 | 25.0 | 5.7 | 12.7 |
| (HMPA)₄Pr(OSO₂CF₃)₃ | Light green | 315 | 24.8 | 5.5 | 12.9 | 24.7 | 5.6 | 12.5 |
| (HMPA)₄Nd(OSO₂CF₃)₃ | Light violet | 320 | 24.8 | 5.5 | 12.8 | 24.8 | 5.6 | 12.6 |
| (HMPA)₄Gd(OSO₂CF₃)₃ | White | 307 | 24.7 | 5.5 | 12.7 | 24.7 | 5.6 | 12.6 |
| (HMPA₄)Eu(OSO₂CF₃)₃ | do | 310 | 24.7 | 5.5 | 12.6 | 24.7 | 5.6 | 12.7 |
| (HMPA)₄Y(OSO₂CF₃)₃ | do | 312 | 25.9 | 5.7 | 13.4 | 26.0 | 5.9 | 13.2 |
| (NMMO)₅Nd(OSO₂CF₃)₃ | Light blue | 240 | 28.6 | 4.7 | 6.0 | 28.6 | 5.0 | 5.9 |
| (NMMO)₅Pr(OSO₂CF₃)₃ | Yellow | 230 | 28.5 | 4.7 | 5.9 | 28.9 | 4.8 | 5.9 |
| (NMMO)₅La(OSO₂CF₃)₃ | White | 245 | 28.6 | 4.7 | 6.0 | 28.4 | 4.8 | 5.9 |
| (NMMO)₅Eu(OSO₂CF₃)₃ | do | 245 | 28.6 | 4.7 | 5.9 | 26.4 | 4.5 | 5.1 |
| (NMMO)₅Y(OSO₂CF₃)₃ | do | 235 | 30.0 | 4.9 | 6.2 | 29.0 | 4.7 | 5.8 |
| (NMMO)₅ Gd(OSO₂CF₃)₃ | Light yellow | 260 | 28.3 | 4.6 | 5.9 | 25.3 | 4.5 | 5.1 |

[1] Decomposition.

EXAMPLE 10

Neodymium salts are prepared by the above procedure using perfluorobutane sulfonic acid, perfluorohexane sulfonic acid, perfluoroethylcyclohexane sulfonic acid, perfluoroethane sulfonic acid, β-hydro perfluoropentane sulfonic acid ($C_3F_7CHFCF_2SO_3H$), and β-hydroperfluoroethane sulfonic acid ($CHF_2CF_2SO_3H$). These are dried and portions decomposed in argon at 800° C. to give pure neodymium fluoride. The perfluorobutane and perfluorohexane groups are recovered in part as perfluoropropionic and perfluorovaleric acids respectively.

Other lanthanide metals and Group IIIb metals are also converted to trifluoromethane sulfonates, the salts pyrolyzed and the fluorides recovered. Suitable metals (in trivalent form) are cerium, praeseodymium, promethium, samarium, europium, gadolinium, terbium, dysporsium, holmium, erbium, thulium, ytterbium, lutecium, yttrium, scandium.

These various fluoroaliphatic sulfonate salts form hydrates and the complexes of Example 9 with hetero-atom oxide ligands pyrolyze to pure metal fluorides.

EXAMPLE 11

Roentgenographic study of crystals of neodymium and yttrium perfluoromethanesulfonate nonahydrates provides the parameters tabulated below:

TABLE

| | $Nd(CF_3SO_3)_3 \cdot 9 H_2O$ | $Y(CF_3SO_3)_3 \cdot 9 H_2O$ |
|---|---|---|
| Cell type | Hexagonal | Hexagonal. |
| Space group | P6₃/m | P6₃ or P6₃/m. |
| a (A.) | 13.880(2) | 13.532(2). |
| c (A.) | 7.472(1) | 7.644(3). |
| Molecules per unit cell | 2 | 2. |
| V (A.³) | 1,246.6(4) | 1,212(1). |
| Molecular weight | 753.44 | 698.24. |
| Observed density (gm./cc.) | 2.00 | 1.90. |
| Calculated density | 2.007(1) | 1.912(1). |

What is claimed is:

1. Salts of scandium, yttrium and lanthanides with straight chain or branched primary and secondary perfluoroalkane sulfonic acids, monohydroperfluoroalkane sulfonic acids containing a hydrogen atom not on the carbon atom adjacent to the sulfonic group or perfluorocycloalkane sulfonic acids of up to 18 carbon atoms, the hydrates of said salts and the Werner complexes of said salts with hexamethylphosphoramide or N-methylmorpholine oxide.

2. Salts according to claim 1 of scandium, yttrium and lanthanides with trifluoromethanesulfonic acid and the hydrates of said salts.

References Cited

UNITED STATES PATENTS 3,334,033  8/1967  Romanowski et al. _____ 204—51

DANIEL E. WYMAN, Primary Examiner

A. P. DEMERS, Assistant Examiner

U.S. Cl. X.R.

260—242, 429.2, 503